US008855410B2

(12) United States Patent
Fenney

(10) Patent No.: US 8,855,410 B2
(45) Date of Patent: Oct. 7, 2014

(54) METHOD AND APPARATUS FOR COMPRESSING AND DECOMPRESSING DATA

(71) Applicant: Imagination House, Home Park Estate, Kings Langley (GB)

(72) Inventor: Simon Fenney, St. Albans (GB)

(73) Assignee: Imagination Technologies, Limited, Kings Langley, Hertfordshire (GB)

( * ) Notice: Subject to any disclaimer, the term of this patent is extended or adjusted under 35 U.S.C. 154(b) by 0 days.

(21) Appl. No.: 14/016,229

(22) Filed: Sep. 3, 2013

(65) Prior Publication Data

US 2014/0169670 A1 Jun. 19, 2014

Related U.S. Application Data

(63) Continuation of application No. 13/487,258, filed on Jun. 4, 2012, now Pat. No. 8,526,726, which is a continuation of application No. 12/009,671, filed on Jan. 22, 2008, now Pat. No. 8,204,324.

(30) Foreign Application Priority Data

Oct. 30, 2007 (GB) .................................. 0721315.0

(51) Int. Cl.
| | |
|---|---|
| *G06K 9/00* | (2006.01) |
| *H04N 19/176* | (2014.01) |
| *G06T 9/00* | (2006.01) |
| *H04N 19/154* | (2014.01) |
| *H04N 19/46* | (2014.01) |

(52) U.S. Cl.
CPC .......... *G06T 9/008* (2013.01); *H04N 19/00278* (2013.01); *H04N 19/002* (2013.01); *H04N 19/00545* (2013.01); *G06T 9/005* (2013.01)
USPC ............ 382/162; 382/166; 382/167; 382/274

(58) Field of Classification Search
USPC ................. 382/162, 166, 167, 168, 232, 233; 345/589, 592, 593; 358/518, 520, 523; 348/453
See application file for complete search history.

(56) References Cited

U.S. PATENT DOCUMENTS

| 7,054,366 | B2 * | 5/2006 | Tardif ....................... 375/240.21 |
| 8,023,754 | B2 * | 9/2011 | Suzuki et al. ................. 382/236 |
| 2005/0069210 | A1 * | 3/2005 | Tardif ............................ 382/233 |
| 2006/0126952 | A1 * | 6/2006 | Suzuki et al. ................. 382/233 |

* cited by examiner

*Primary Examiner* — Ali Bayat
(74) *Attorney, Agent, or Firm* — Michael S. Garrabrants

(57) ABSTRACT

An example method includes interpreting compressed source data to produce a set of representative colors and modulation data. Portions of the modulation data are interpreted as a plurality of vectors. Each vector pertains to a respective region of the image, which has multiple portions, each with elements. Modulation data is interpreted to include vector modifier data. A respective color for each element within a first portion of the region is determined from the set of representative colors, which are combined according to a selected vector (can be a selection made from a subset of the plurality). Colors for elements in other portions of the region are determined by selecting a vector, modifying the vector according to vector modifier data, and applying the modified vector with the set of representative colors to produce colors for elements in the region. Aspects include systems and methods for source data compression and image reconstruction.

25 Claims, 12 Drawing Sheets

METHOD AND APPARATUS FOR COMPRESSING AND DECOMPRESSING DATA

CROSS REFERENCE TO RELATED APPLICATIONS

This application is a continuation of U.S. Ser. No. 13/487,258, filed on Jun. 4, 2012, which is a continuation of U.S. application Ser. No. 12/009,671, filed on Jan. 22, 2008, now U.S. Pat. No. 8,204,324 issued on Jun. 19, 2012, which claims priority from GB 0721315, all of which applications are incorporated herein in their entirety by reference.

FIELD OF THE INVENTION

This invention relates to a method of compressing data and a method of, and apparatus for, decompressing data. The invention may be used in computer graphics systems, and in particular, in computer graphics systems that generate three-dimensional images using texturing by applying texture image data to 3D surfaces.

BACKGROUND TO THE INVENTION

In 3D computer graphics, surface detail on objects is commonly added through the use of image-based textures, as first introduced in 1975 by Ed Catmull ("Computer Display of Curved Surfaces", Proc. IEEE Comp. Graphics, Pattern Recognition and Data Structures. May 1975). For example, a 2D bitmap image of a brick wall may be applied, using texture mapping, to a set of polygons representing a 3D model of a building to give the 3D rendering of that object the appearance that it is made of bricks.

Since a complex scene may contain very many such textures, accessing this data can result in two related problems. The first is simply the cost of storing these textures in memory. Consumer 3D systems, in particular, only have a relatively small amount of memory available for the storage of textures and this can rapidly become filled, especially if 32 bit per texel—eight bits for each of the Red, Green, Blue, and Alpha (translucency) components—textures are used.

The second, and often more critical problem, is that of bandwidth. During the rendering of the 3D scene, a considerable amount of texture data must be accessed. In a real-time system, this can soon become a significant performance bottleneck.

Finding solutions to these two problems has given rise to a special class of image compression techniques commonly known as texture compression. A review of some existing systems can be found in "*Texture Compression using Low-Frequency Signal Modulation*", (S. Fenney, Graphics Hardware 2003) or the related patent, GB2417384. Some more recent developments are documented in "*iPACKMAN: High-Quality, Low-Complexity Texture Compression for Mobile Phones*" (Ström and Akenine-Möller, Graphics Hardware 2005) and the follow-up work, "*ETC2: Texture Compression using Invalid Combinations*" (Ström and Pettersson, Graphics Hardware 2007).

One system for compressing and decompressing image data that is particularly well suited to texture data is described in GB2417384, the contents of which are incorporated herein by reference. In the system of GB2417384 image data is stored in a compressed form comprising two or more low resolution images together with a modulation data set. The modulation data set describes how to combine the low resolution images to provide the decompressed image data.

The decompression process of GB2417384 will now be briefly described with reference to FIG. 1. The process is normally applied to colour data but is shown here in monochrome for reproduction reasons. The compressed data includes two low-resolution colour images, 100 and 101, and a full resolution, but low precision, scalar image 102 forming a modulation data set. The data of the low resolution images are upscaled, preferably using bilinear or bicubic interpolation, to produce two corresponding virtual images, 110 and 111. Note that the upscaled virtual images lack much of the detail of the final image.

Pixels, 112 and 113, from their respective virtual images, 110 and 111, and the corresponding scalar value, 120, from the full resolution, low precision scalar data, 102, are sent to a blending/selection unit, 130, which blends/selects, on a per-texel basis, the data from 112 and 113 in response to 120, to produce the decompressed data, 141 of the entire image, 140. The mode by which the combination is done is chosen on a region-by-region basis.

For reference purposes, the storage format for the data of the preferred embodiments of GB2417384 is given in FIG. 2. Data is organised in 64-bit blocks, 200, at the rate of one 64-bit block per 4×4 group of texels for the 4 bpp embodiment, or one per group of 8×4 texels for the 2 bpp embodiment. Two 'base colours', 201 and 202, correspond to the two representative colours or, equivalently, a single pixel from each of the low resolution colour images 100 and 101 of FIG. 1. Each single pixel from the low resolution colour images corresponds to an (overlapping) region of texels in the decompressed image. Each such region is approximately centred on 4×4 (or 8×4) block of texels in the decompressed image, but is larger than 4×4 (8×4) due to the upscale function. The upscaling of the low resolution images is preferably performed using a bilinear or bicubic interpolation with the nearest neighbour pixels. A single bit flag, 203, then controls how the modulation data, 204, is interpreted for the 4×4 (or 8×4) set of texels. The sets of texels that are controlled by each flag are shown in FIG. 7.

The 4 bpp preferred embodiment of GB2417384 has two mode choices per region, where each region is a 4×4 set of texels. The first mode allows each texel to select one of (a), the colour of texel from 100, (b), the colour from the texel of 101, (c), a 3:5 blend of 100 and 101 and (d), a 5:3 blend of 100 and 101. The second mode allows a choice of (a) and (b) above but replaces (c) and (d) with (e), a 1:1 blend of 100 and 101, and (f), the RGB values from (e) but with the alpha component set to 0, i.e. fully transparent.

It should be noted that FIG. 1 is merely describing the concept of the decompression process and that the upscaled virtual images, 110 and 111, are unlikely to be produced and stored in their entirety in a practical embodiment. Instead, small sections of the virtual images, preferably 2×2 pixel groups, may be produced and discarded, 'on the fly', in order to produce the requested final texels.

In GB2417384, the base colour data may be in one of two possible formats as shown in FIG. 2. Each of the colours 201, 202 may independently be either completely opaque, in which case format 210 is used, or partially or fully translucent, in which case format 211 is used. A one-bit flag 212 that is present in both colours 201 and 202 determines the choice of format for each representative colour. If this bit is '1', then the opaque mode is chosen, in which case the red 213, green 214, and blue 215 channels are represented by five, five and five bits respectively for base colour B, and five, five, and four bits respectively for base colour A. Note that the reduction in bits for base colour A is simply due to reasons of space. Alternatively, if flag 212 is '0', the corresponding colour is partially transparent and the colour contains a three bit alpha channel, 216, as well a four bit Red, 217, four bit Green, 218, and a Blue field, 219, which is either four or three bits for colour 201 or 202 respectively. Since a fully opaque colour is implied by field 212, the alpha field, 216, does not need to encode a fully opaque value.

The present invention aims to improve the texture compression method of GB2417384. In particular, the improvements are intended to address the compression of certain types of images, or sections of images, that are not handled particularly well by the method of GB2417384, and to simplify the use of a popular technique that packs multiple, small, pre-compressed pieces textures into a larger resolution texture.

SUMMARY OF THE INVENTION

The invention in its various aspects is defined in the independent claims to which reference should now be made. Advantageous features are set forth in the dependent claims.

In a first aspect the invention is a method for compressing electronic image data, comprising the steps of:

a) generating at least two sets of reduced size data from the image data, each element of each set of reduced size data being representative of a plurality of elements of the image data;

b) generating modulation data from the image data, the modulation data encoding information about how to combine the sets of reduced size data to generate an approximation to the image data;

c) generating a plurality of discontinuity flags, each discontinuity flag corresponding to an area of the image data, the value of each discontinuity flag being based on an assessment of whether the corresponding area of image data contains a large discontinuity; and d) storing the reduced size data sets, the modulation data and the discontinuity flags as compressed data.

In a second aspect, the invention is a method for decompressing compressed electronic image data, the compressed data comprising at least two sets of reduced size data, each element of each set of reduced size data being representative of a plurality of elements of the image data, modulation data, the modulation data encoding information about how to combine the sets of reduced size data to generate an approximation to the image data, and a plurality of discontinuity flags, each discontinuity flag corresponding to an area of the image data, comprising the steps of:

a) expanding each reduced size data set to produce an expanded data set, the method of expansion for each element of the reduced size data sets dependent on the value of a corresponding discontinuity flag; and b) combining the expanded data sets using the modulation data to generate an approximation to an original image data set.

In a third aspect, the invention is an apparatus for decompressing compressed electronic image data, the compressed data comprising at least two sets of reduced size data, each element of each set of reduced size data being representative of a plurality of elements of the image data, modulation data, the modulation data encoding information about how to combine the sets of reduced size data to generate an approximation to the image data, and a plurality of discontinuity flags, each discontinuity flag corresponding to an area of the image data, comprising:

a) an input for receiving the compressed data;

b) expanding means, coupled to the input, for expanding each reduced size data set to produce an expanded data set, the method of expansion for each element of the reduced size data sets dependent on the value of a corresponding discontinuity flag; and c) a combiner, coupled to the input and to the expanding means, for combining the expanded data sets using the modulation data to generate an approximation to a portion of the original image data set.

The invention allows for a first improvement to the method of GB2417384 in situations where there are large colour discontinuities in the images along horizontal and/or vertical boundaries between texels on certain multiples of texels, for example on multiples of four texels. Although these could occur 'naturally' they are far more frequently the result of assembling a 'texture atlas' whereby multiple smaller texture images are assembled into a single larger texture for efficiency reasons. An example of such a texture is given in FIG. 4, wherein a large texture, 180, is composed of numerous smaller textures, such as 181. Due to the popularity of DirectX and the DXT (equivalent to S3TC) compression method, wherein each 4×4 (or more recently 8×8) block of texels is compressed completely independently of the other blocks, the dimensions of these smaller images, e.g. 182, are generally constrained to be multiples of 4 or 8 texels. In the method of GB2417384, there are no 'boundaries' per se, which generally makes compression better since it avoids block artefacts sometimes apparent in other methods (again refer to "*Texture Compression using Low-Frequency Signal Modulation*" S Fenney, Graphics Hardware 2003). The disadvantage of this, however, is that it does make assembling a texture atlas, without either resorting to additional and wasteful padding texels between sub-images, or expensive recompression processing, very difficult.

The invention allows for a further improvement where a texture contains regions whose texels have more than two distinctly different colours. The existing method of GB2417384 does not handle textures of this type very well. An example of problematic image case is shown in FIG. 3. This shows a small section of a texture that contains adjacent red, blue, and green stripes. Note that this type of region would be very difficult to represent not only in the earlier invention but also in other 'state of the art' texture compression schemes such as S3TC and iPACKMAN. Although such extreme high rates of change of colours are relatively rare in natural images, they can be more frequent in artist drawn images or diagrams. Ironically, this type of image is not problematic, per se, for palette-based textures/texture compression, but palette-based textures have their own failings (again refer to "*Texture Compression using Low-Frequency Signal Modulation*").

The invention aims to enhance the invention of GB2417384 without increasing the storage costs of the existing method or compromising the quality. It has been noted that, in practice, certain colour combinations of the pairs of representative values used in GB2417384 are not used. In particular, each representative colour has a single bit flag indicating if the colour is 100% opaque or if it is partially (or wholly) transparent. This level of flexibility is unnecessary in practice and so, by re-assigning one of the two opacity flags for another purpose, new compression modes for regions of the texture can be chosen.

A preferred first new mode for regions of texels is used when a strong colour discontinuity is assumed to occur between certain texels in that region. This simplifies the assembly of texture atlases, especially from pre-compressed sub-textures, as well as enhancing a small number of cases in normal images.

A preferred second new mode extends the discontinuity concept by allowing texels in indicated regions to arbitrarily choose colours from a subset of the nearest four neighbouring pairs of representative colours. This, in effect, partially mimics the behaviour of palette textures, but avoids the undesirable property of requiring indirection into a palette memory.

In extending the invention of GB2417384, it is also highly desirable that the new invention still be able to support data encoded using GB2417384 with, for cost reasons, negligible additional hardware.

Furthermore, in 3D computer graphics, it is very common to apply a bilinear filter to the texture data, which requires sets of 2×2 adjacent texels. It is therefore an aim that, when decoding 2×2 adjacent texels at most 2×2 blocks of compressed data, where each block is preferably 64-bits, should be needed. This aim will be referred to as the "minimal bilinear read requirement".

BRIEF DESCRIPTION OF THE DRAWINGS

Embodiments of the invention will now be described in more detail in accordance with the accompanying drawings in which.

DETAILED DESCRIPTION

Two preferred embodiments of the invention will be described. The first stores a texture at 4 bits per pixel (bpp) and the second stores a texture at the rate of 2 bpp. In both cases, different modes are selectable for localised regions of the texture.

The present invention is based on the compressed data format described in GB2417384. The compressed data format comprises two low resolution colour data sets, generated using a filtering process, such as a wavelet filter, and associated modulation data. The compressed data also includes a 1-bit modulation mode flag, as shown in FIG. 2.

The first issue, in supporting more local 'modes', is encoding the extra options into the data without requiring additional bits of storage. In S3TC, for example, the numerical ordering of the stored block colours can be used to imply an additional bit. This is feasible in schemes such as S3TC and, say, iPACKMAN/ETC2 because each 4×4 block of texels is completely independent of all other such blocks. This is not the case with the compression method of GB2417384 as blocks share neighbouring data in order to improve the quality of the compression.

Figure 2:
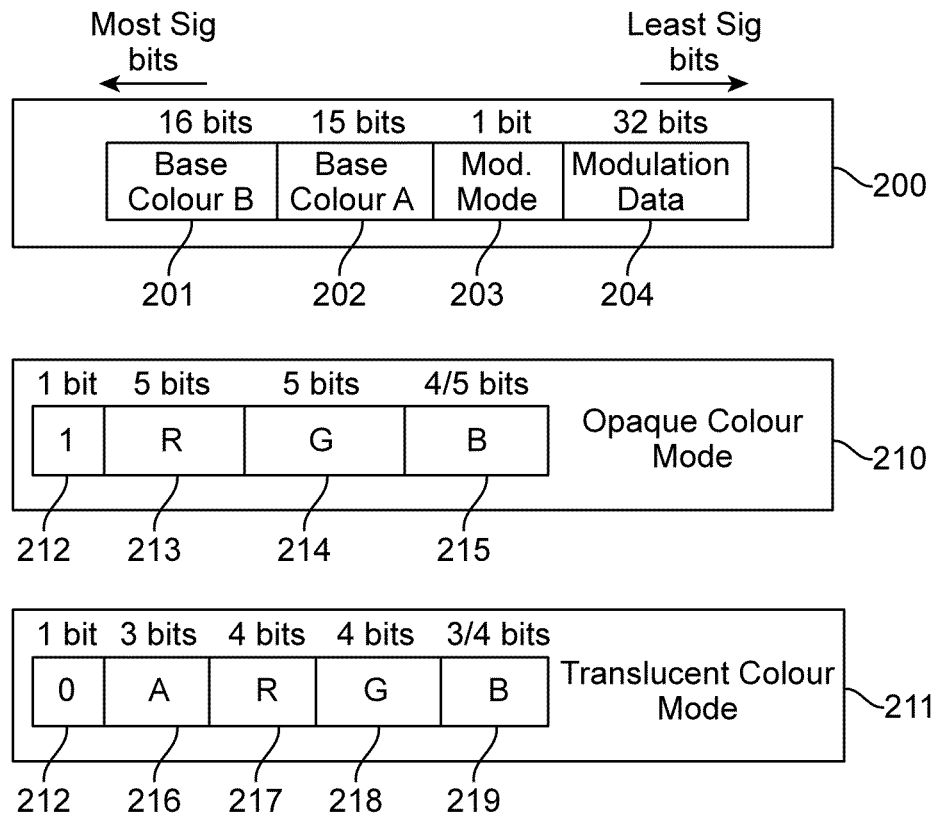
FIG. 2 illustrates the format of colour data in GB2417384 when packed into 64-bit units.
Figure 3:
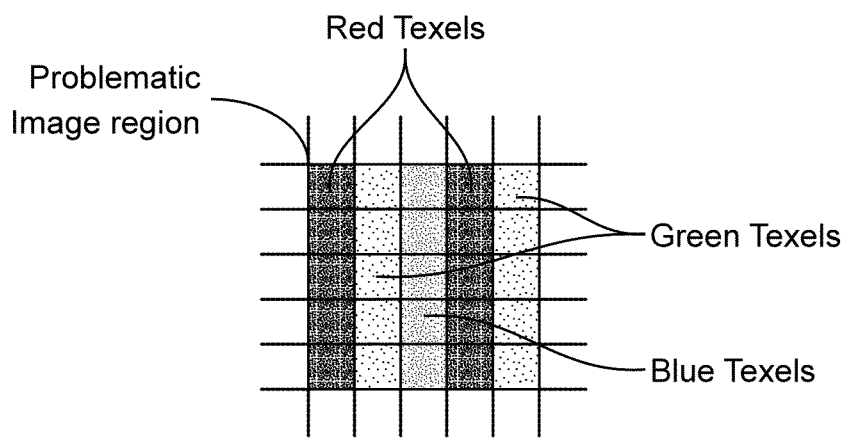
FIG. 3 shows an example of a problematic image for many texture compression systems, including that of GB2417384.
Figure 5:
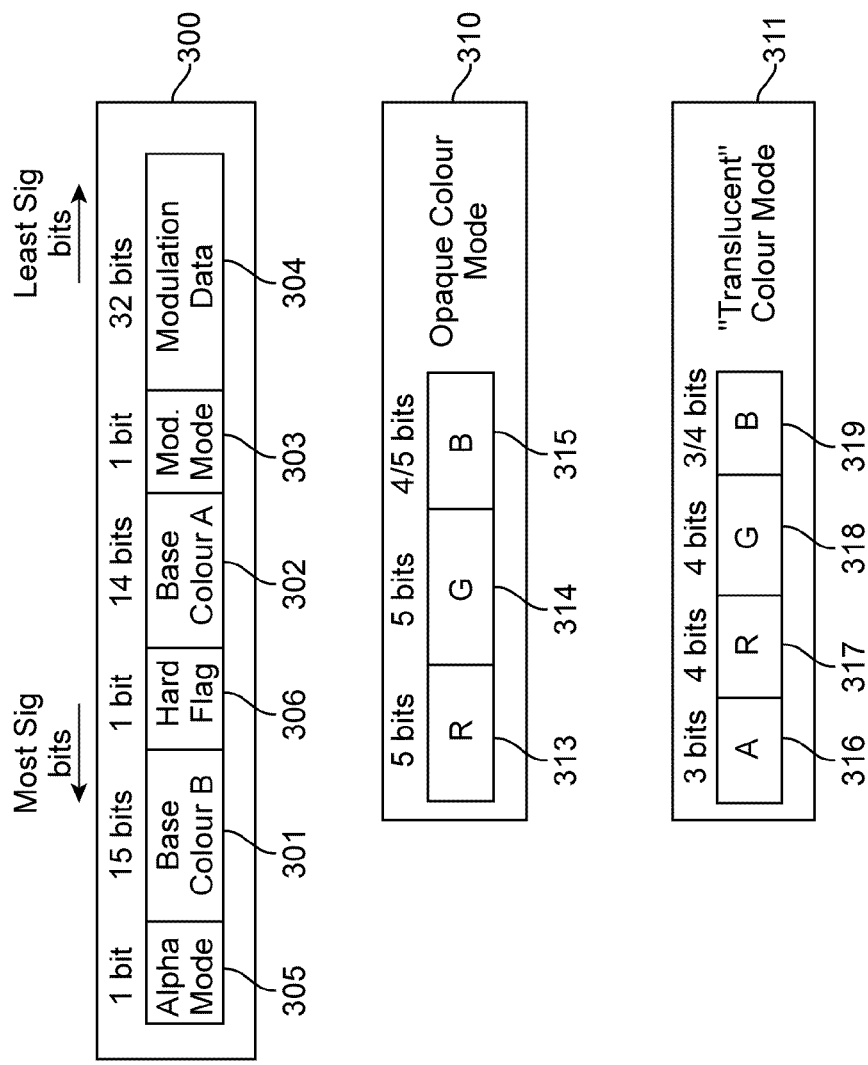
FIG. 5 illustrates the format of colour data in the preferred embodiment when packed into 64-bit units.

The inventor has appreciated that the level of flexibility offered by the colour encoding scheme of GB2417384, as shown in FIG. 2, is far in excess of what is needed in practice. The ability to have both representative colours A and B independently determine whether they are fully opaque or partially transparent is unnecessary and in a preferred embodiment of the present invention, the encoding scheme is replaced with that of FIG. 5. As with GB2417384, data is again preferably encoded in 64-bit units with the format, 300, replacing that of 200. Again, there are two representative colours, B, 301, and A, 302, a modulation mode bit, 303, and the modulation data, 304. Two additional one bit fields, "AlphaMode", 305, and "hard flag", 306 are also included. To make space for these fields, the colour fields, 301 and 302 are both reduced by one bit in size relative to the encoding of FIG. 2.

The alpha mode flag, 305, indicates if both representative colours are fully opaque or if A, or both A and B, are partially transparent. In the first case, both colours are encoded with the format of 310, otherwise both colours are encoded with format 311.

Format 310, containing red, 313, green, 314, and blue, 315, fields is functionally identical to that of 210 of GB2417384.

The translucent format 311 is more complicated. The red, 317, green, 318, and blue, 319, fields of 311 are interpreted in an identical fashion to that of 211 of GB2417384, but the alpha channel interpretation differs.

For the case of colour B, 301, the three bit alpha field, 316, A is converted to an 8-bit alpha value as described by the following "C" code.

temp=(A<<3)|1;
Alpha_out=(temp<<4)|temp;

For example, the binary 3-bit value, 0b110, would be converted to the 8-bit binary value 0b11011101.

For the case of colour A, 302, the three bit alpha field, 316, A is converted to an 8-bit alpha value as described by the following "C" code.

temp=(A<<3)|0;
Alpha_out=(temp<<4)|temp;

In this case, the binary 3-bit value, 0b110, would instead be converted to the 8-bit binary value 0b11001100. This latter encoding method is the same as that which was used universally in GB2417384 for mode 211.

Note that colour B cannot achieve a fully transparent value of 0 but can encode a fully opaque value of 255. Conversely, colour A can be fully transparent, but cannot be fully opaque. When encoding texture data, these constraints, in practice, are not an issue.

Figure 6:
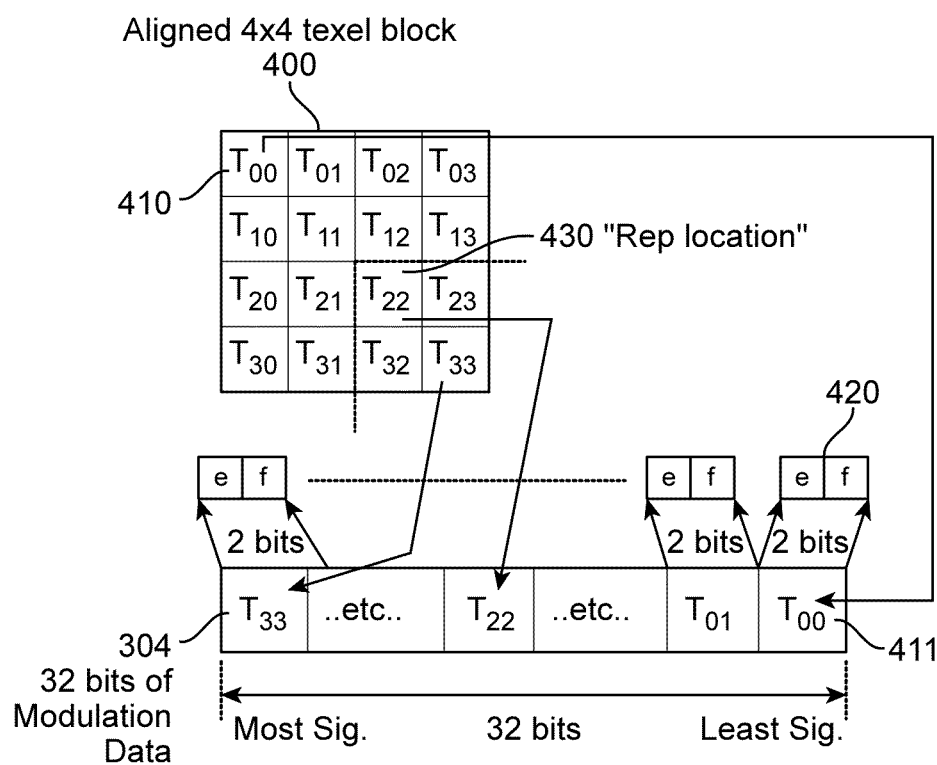
FIG. 6 shows the mapping of modulation bits to texels in 4×4 blocks.

FIG. 6 illustrates the mapping of bits in the modulation field, 304, to texels in a 4×4 aligned texel block, 400. Texels are mapped from left to right and top to bottom to the data field, two bits at a time, from least significant to the most significant bits. For example, $T_{00}$, the top left texel, 410, in the block, 410, is assigned the two least significant bits, 411, in the modulation field, 304. The least significant bit of each of these two bit fields will later be referred to as T and the more significant as 'e', 420.

The other newly introduced field, discontinuity flag or hard flag 306, is used to enable new encoding modes. The hard flag is a 1-bit flag and can therefore take on two values. The value of the hard flag determines how the related reduced size colour data is upscaled. In a preferred embodiment, if the hard flag has a value 0, the colour data is expanded using bilinear interpolation. If the hard flag has the value 1, the colour data is expanded using simple replication.

Figure 1:
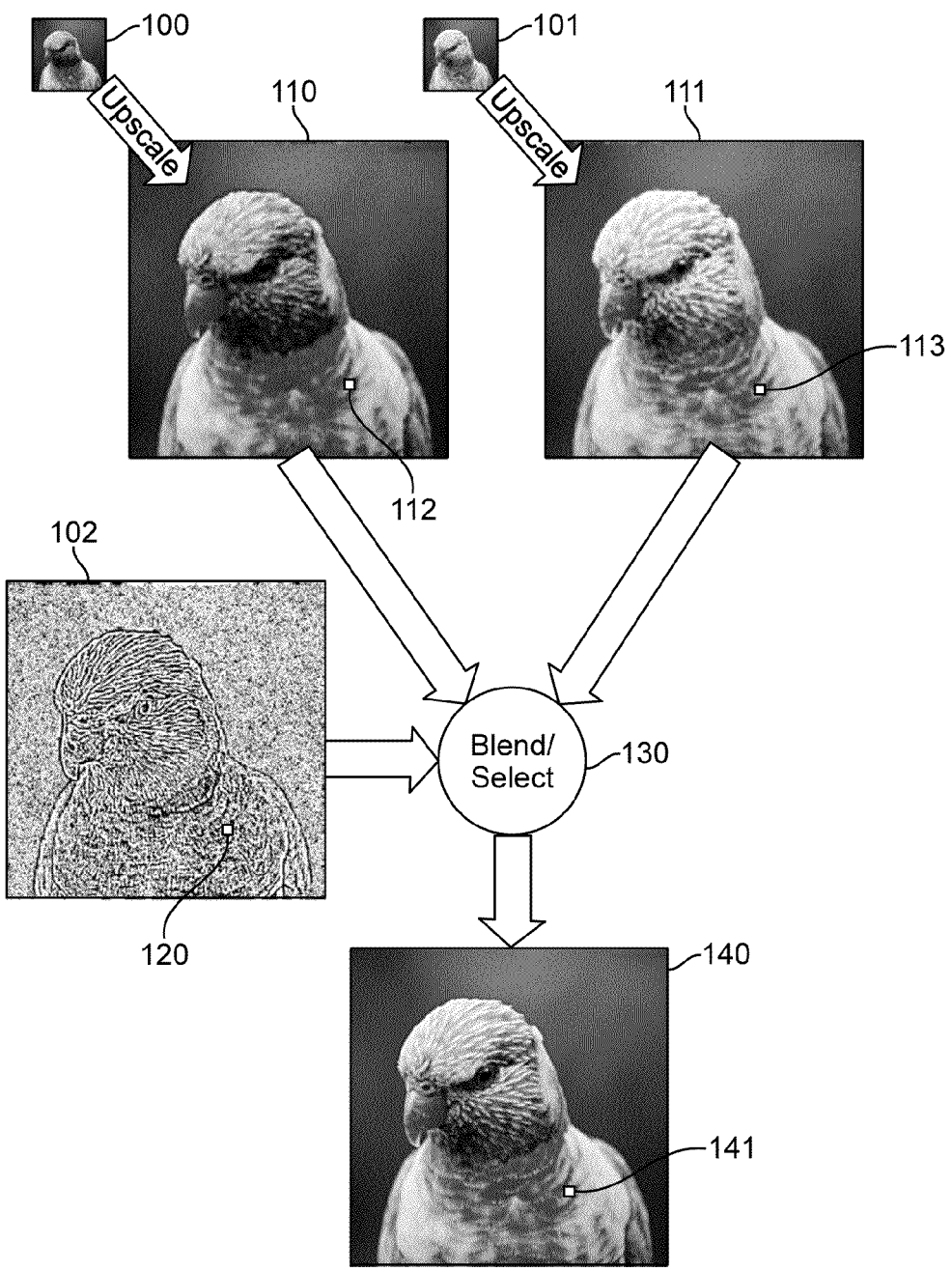
FIG. 1 illustrates a broad overview of the decompression process of GB2417384.
Figure 4:
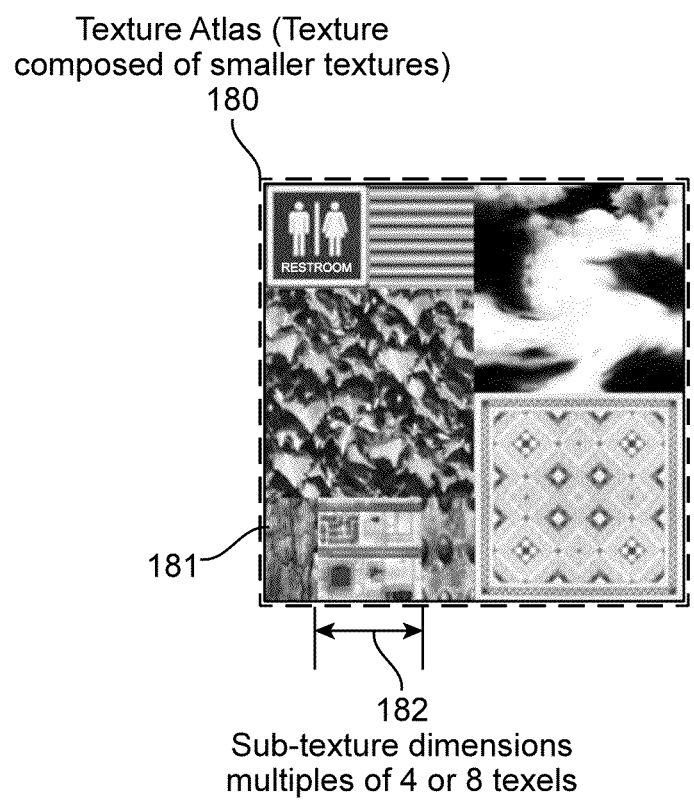
FIG. 4 is an example of a "texture atlas" texture.
Figure 7:
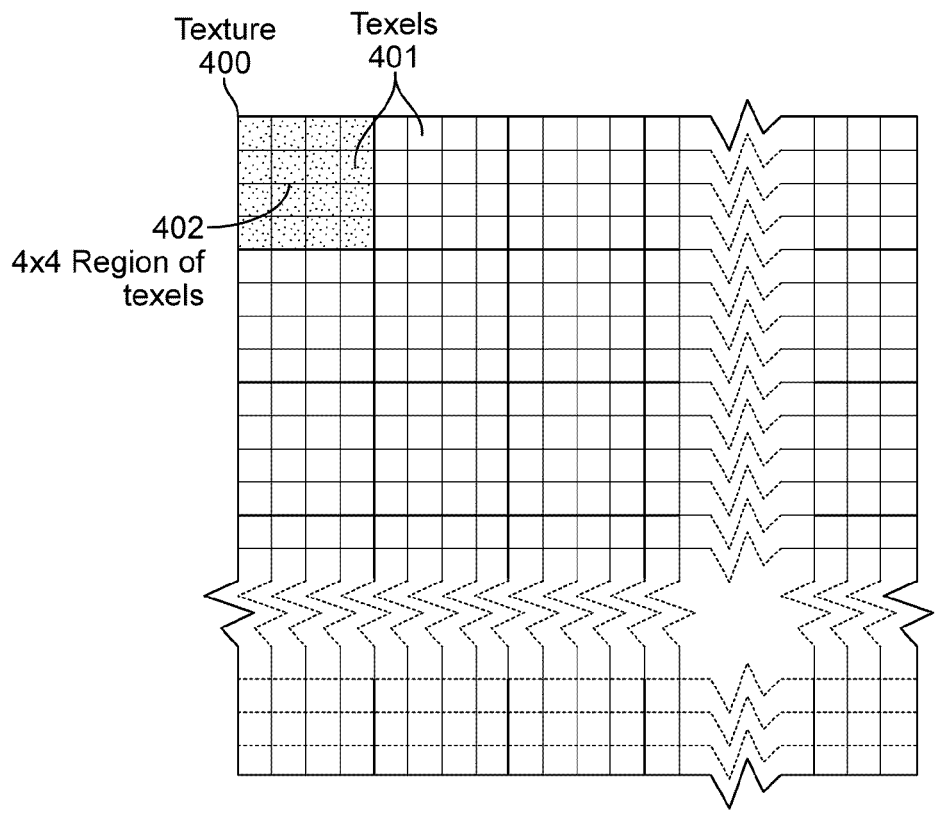
FIG. 7 shows the alignment of texel 'mode' regions for a 4 bpp embodiment.

The 4 bpp preferred embodiment will be described first. To enhance support of texture atlases such as that of FIG. 4, the normal (bilinear) interpolation of the low-resolution colour data, as shown in the conversion from 100 to 110 and 101 to 111 in FIG. 1, is locally replaced with colour replication at sub-texture boundaries. One way to do this is to set the replication of the base colours to match that of the normal texel mode regions as controlled by field 303 (or 203). For illustrative purposes, these regions, for the 4 bpp mode, are shown in FIG. 7. Here the texture, 400, consisting of texels such as 401, has these texels grouped into 4×4 regions, e.g. 402, that are aligned on regular, four texel boundaries.

If a system did replace the interpolation with a replication system on an aligned region-by-region manner (e.g. region 402), then it would be able to emulate, to some extent, the behaviour of S3TC.

Figure 8:
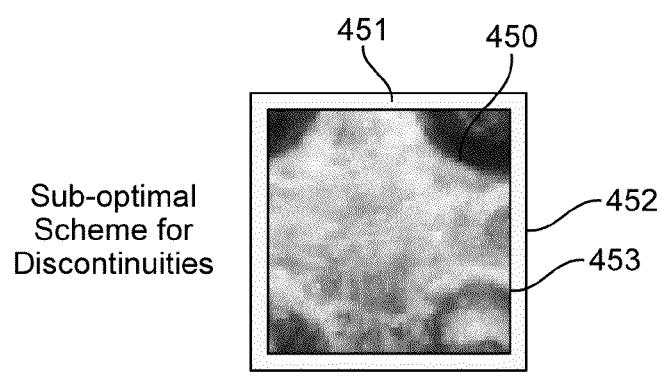
FIG. 8 illustrates a sub-optimal method for supporting discontinuities such as those that occur in texture atlases.

This scheme, however, is sub-optimal. The dimensions of sub-textures in a texture atlas are generally constrained to be multiples of 4 or 8 texels and so the boundaries of the sub-textures are always aligned with the edge of the texel blocks corresponding to each element of the reduced size data sets, as shown in FIG. 7. In order to make sub-textures compatible for use in a texture atlas, all the border blocks (on both sides of the border) would have to be flagged as discontinuous and so undergo colour replication, as shown in FIG. 8. Here a 64×64 texture, 450, has all 4×4 blocks around the border, shown as the highlighted area 451, set to use the non-interpolation mode. This achieves the necessary discontinuity at the extremities, 452, but has the undesirable side-effect of introducing an unnecessary discontinuity between the pixels on the inside edge 453 of the highlighted area 451. This could seriously decrease the quality of the compressed result for pixels in the neighbourhood of 453.

A better scheme is to just imply a discontinuity along two of the edges of each marked, 4×4 region, such as implying a discontinuity along the top and left edges. In a texture atlas, the bottom and right edges of a sub-texture would then 'inherit' a discontinuity from the neighbouring lower and right sub-textures. Unfortunately, this scheme is not symmetrical and so is not ideal.

Figure 9:
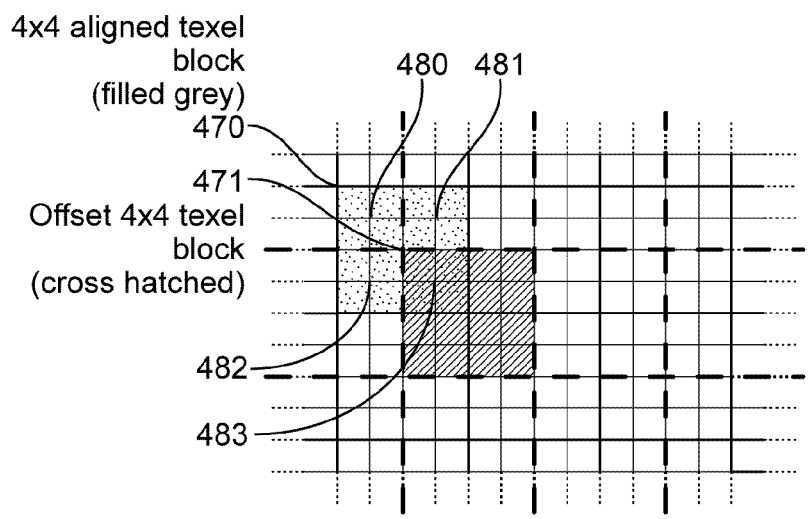
FIG. 9 illustrates a preferred 4 bpp method for indicating regions with discontinuities.

Instead, in the preferred embodiment, the region affected by the discontinuity/hard flag, 306, of a 64-bit data block, 300, affects a region of texels that are offset by 2 texels in the x and y directions relative to the aligned 4×4 texel regions governed by the modulation mode flag, 303. An example is given in FIG. 9, which shows an aligned 4×4 texel block, 470 (highlighted in grey), as controlled by the modulation flag of one particular 64-bit data block, 300. The region of texels affected by the hard flag, on the other hand, is shown in the cross-hatched region, 471.

This means that each 2×2 set of texels are governed by two flags, a hard flag and a modulation mode flag, which may come from different 64-bit data blocks. For the texels in any particular aligned block, however, the modulation mode bit always comes from the parent 64-bit data block. The hard-flag for the top-left 2×2 texel quad, 480, is obtained from the block to the above and left, for the top right quad, 481, from the block above, for the bottom left, 482, from the block to the left, and the bottom right quad, 483, from it's own block. The mapping is toroidal in that the top row of quads of the texture obtains its hard-flags from the corresponding blocks in the bottom row of the texture. Similarly, the left-hand column of quads obtains its flags from the right hand extreme of the texture.

Note that this selection does not invalidate the "minimal bilinear read requirement".

The value of the hard flag 306 can be chosen based on an assessment of the related image area. A simple algorithm for detecting discontinuities in the colour data above a certain threshold can be used when compressing each block of data. One such scheme would involve the steps of (a) low-pass filtering the texture data, (b) computing a delta image that contains the texel-by-texel differences between the original source texture and the low-pass filtered data, and (c) analysing the delta image texels. For example, if along the bottom right corner of a particular 4×4 texel region, the magnitudes of the delta texels are relatively large and the orientations of the delta vectors are generally in opposite directions on either side of the block boundary, then the region is a likely candidate for using the hard mode.

In this embodiment, the colour data, modulation data and associated flags are stored together in a 64 bit data block. However, it is possible for the colour data, modulation data and flags to be stored separately, or in any combination. It is also possible for the colour data, modulation data and associated flags to be stored in different size data blocks.

In the preferred 4 bpp embodiment, the compression/decompression mode of each 2×2 quad is governed by the combination of its 'modulation' and 'hard' flags, as summarised in Table 1 as follows:

TABLE 1

| Modulation Flag | Hard Flag | Encoding Mode |
|---|---|---|
| 0 | 0 | Standard: Bilinear interpolation of represent colours, 4 choices of colour blend of interpolated results |
| 1 | 0 | Punch-through: Bilinear interpolation of base colours, 3 choices of colour blend of interpolated results plus choice of fully translucent black. |
| 0 | 1 | Discontinuity: Repetition of nearest base colours with the 4 choices of colour blend as in the Standard mode. |
| 1 | 1 | Alternate: This is either another mode (to be described in the application) or, in an alternate embodiment, repetition of the nearest base colours but with the 'punch-through' blend choices. |

The standard mode above matches that described in GB2417384, in that for each texel, the bilinear upscale of the nearest four A representative colours and bilinear interpolation of the nearest four B representative colours are used to supply two colours for that texel that are then blended according to the stored per-texel modulation value in field 304. For the 4 bpp embodiment, there are two bits per texel giving a choice of four possible colours based on some combination of the two interpolated base colours. As with GB2417384, this choice is from the upscaled A signal at that texel position, the upscaled B signal, a 5:3 blend of the upscaled A and B signals, or a 3:5 blend of the upscaled values.

The punch-through mode is almost identical to the punch-through mode of GB2417384. As with the standard mode, the A and B representatives are bilinearly upscaled to the full resolution. The per-texel colour choice is then one of the upscaled A signal at that texel position, the upscaled B signal, a 1:1 blend of the upscaled A and B signals, or a fully transparent black colour. This last choice differs from GB2417384 in that it assumes the Porter-Duff premultiplied alpha blending model which has benefits over non-premultiplied (as assumed by GB2417384). [For further detail on this subject see "*Compositing-Theory. Jim Blinn's Corner*". IEEE Computer Graphics and Applications, September 1994, the contents of which are incorporated herein by reference]. This option also has the added benefit of allowing independent 'black' pixels to be encoded if one ignores the returned alpha value.

The discontinuity mode disables the bilinear interpolation and, instead, for each texel, it re-uses the representative A and B base colour pair from the 4×4 aligned block containing the particular texel. In a fashion similar to the standard mode, each texel can then choose one of the following colours: the replicated base colour A, the replicated base colour B, a 5:3 blend of base colours A and B, or a 3:5 blend of the replicated base colours. Using the same ratios of blending as in the standard mode thus allows reuse of the same hardware.

Figure 10:
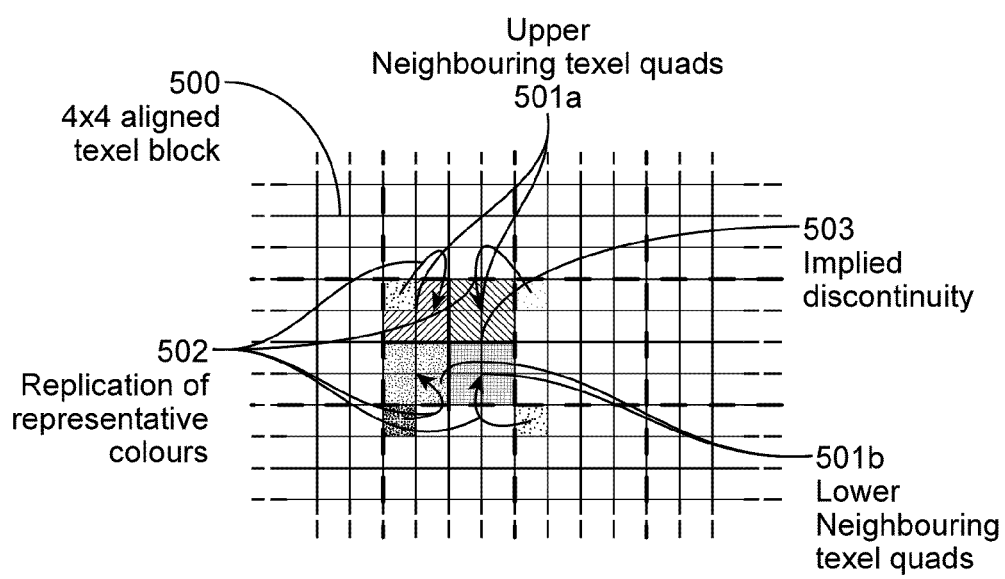
FIG. 10 illustrates the replication of base colours for a representation of discontinuities.

An example of the effect of the discontinuity mode is illustrated in FIG. 10. As before, there is a 4×4 aligned texel block, 500, with neighbouring blocks to the right, below, and below right. Four adjacent texel quads, 501a and 501b, affected by the same 'hard-flag' are shown, each belonging to one of the four neighbouring 4×4 texel groups. It is assumed that each of these four quads is set to use the discontinuity mode. Each quad obtains per-texel base colours by replicating the nearest neighbour representative/base colours, 502. This results in an implied discontinuity that is "+" shaped, as shown by 503. In the case of block 500, this discontinuity lies along the boundary's bottom right corner.

This preferred method minimises the amount of forced discontinuity (without requiring additional data flags) and is symmetrical. For sub-textures that are intended to be assembled into an atlas, just the right-hand and the bottom row of blocks need be forced to be 'discontinuous' as the top and left edges can inherit that property from an adjoining subtexture.

The remaining mode, implied by both flags being set to 1, may, in a simpler embodiment, simply apply the punch-through colour blending modes to the non-interpolated base colours. A preferred embodiment, however, will provide a mode that supports regions of a texture such as that shown in FIGS. 11 and 12. This mode is known in the preferred embodiment as the 'palette' mode. Note, however, that unlike the standard 'palette textures' there is no second indirection or fetch to another memory or cache. The modulation data is simply interpreted differently in this mode to allow for a greater range of colours taken from the representative A and B pairs of four adjacent blocks. In a preferred embodiment, the modulation data is interpreted dependent on the position of the corresponding texel within the region affected by the hard flag to limit the available colours.

In the offset 4×4 region (such as 471) influenced by a particular hard flag, any texel has the potential to access up to 8 'arbitrary' nearby colours consisting of the representative A and B pairs of the nearest four blocks. However, to meet the minimal bilinear read requirement, certain texels must have a more restricted choice of potential source colours. Furthermore, as there is only a budget of two modulation bits per texel in field 304, the choice of colours per texel must be limited to only four colours. They may however be four distinct colours rather than four colours based on a blend of two base colours.

Figure 11:
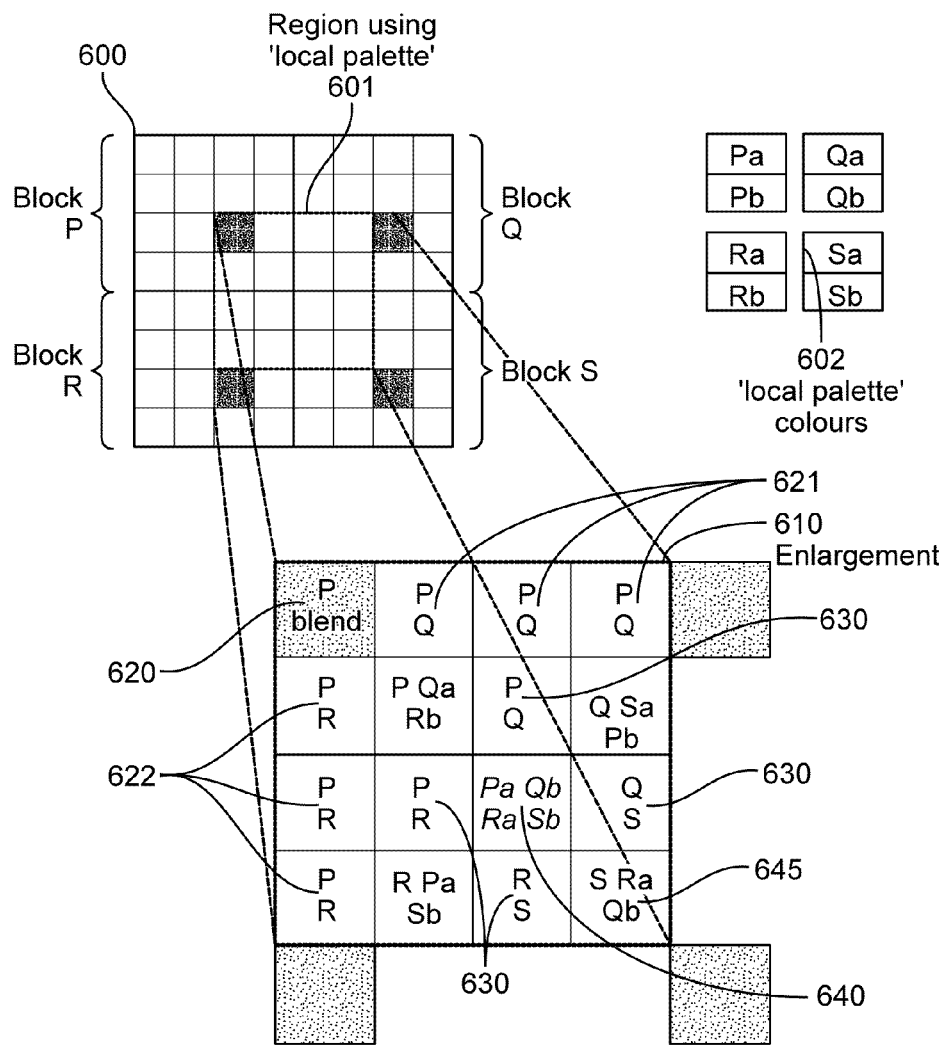
FIG. 11 shows a local palette and per-texel choices from the palette for the local palette mode in a 4 bpp embodiment of the invention.

FIG. 11 illustrates the choices of colours available to each texel assuming all 2×2 texel quads are using the palette mode. The figure shows a set of 2×2, 16-texel aligned blocks, 600, which are named, in left to right, top to bottom order, as BlockP, BlockQ, BlockR and BlockS respectively. Inside is the offset region, 601, which is controlled by the hard flag of BlockQ. Associated with the four blocks is a set of pairs of representative colours, 602, which are labelled Pa and Pb, Qa and Qb, Ra and Rb, and Sa and Sb, sourced from, respectively, blocks P, Q, R and S. This set of eight colours forms a local palette for the offset region, 601.

The enlargement, 610, of region 601, shows the sub-choices of the local palette, 602, available to each texel. To comply with the minimal bilinear read requirement, the texel in the top left corner, 620, of the offset region must depend only upon the representative colours of block P, i.e. Pa and Pb. Since, however, four colours can be chosen, the other two colours are selected from the 5:3 and 3:5 blends as for the 'standard' mode. Again because of the minimal bilinear read requirement, the remaining three texels in the top row, 621, may only select from the representative colours Pa, Pb, Qa and Qb, but this gives a full choice of four colours. Similarly, the remaining three texels in left column, may only choose from representative colours, Pa, Pb, Ra and Rb.

The remaining nine texels are not so restricted and each may choose any subset of four colours from the local palette, 602, but it is desirable that some logical principles are used. These principles are explained below.

Those pixels that are equally close to just two 'representative texel" locations, will select from just those two pairs colour pairs. There are four such texels, 630.

One texel, 640, is equidistant from all four representative texels. To keep the colours usage evenly distributed, 640 will select one colour from each of the base pairs. The base 'A' colour will be used for those to the left and the 'B' colour for those from the right. An alternative, but equally weighted, mapping could also have been chosen.

The four remaining texels are assigned four colour choices as follows: The first two colours are chosen from the texel's closest representative texels. There are two other representative pairs which are the equally the next nearest location. Representative A is chosen from the clockwise representative, and Colour B is chosen from the anticlockwise representative. For example, texel 645 uses both representatives from S, (Sa and Sb), Ra from Block R, being the clockwise nearest neighbour, and Qb from Block Q. This final step equally distributes the representative colours.

Some care must be taken with devising an encoding for the local palette indices. In particular it is desirable to achieve two things: (a) produce an encoding that is 'cheap' in hardware and (b) cleanly handle the "tricky" case of the boundaries between blocks The first step is to assign a mapping from the 3-bit indices to the local palette, 602. The obvious order, i.e. left to right, top to bottom, i.e. 0→Pa, 1→Pb, 2→Qa, 3→Qb, 4→Ra . . . 7→Sb, unfortunately does not lend itself to an inexpensive decoding function. A preferred mapping is given in Table 2.

TABLE 2

| Palette Indices | |
| --- | --- |
| Encoding | Palette colour |
| 000 | Pa |
| 001 | Pb |
| 010 | Sa |

TABLE 2-continued

Palette Indices

| Encoding | Palette colour |
|---|---|
| 011 | Sb |
| 100 | Qa |
| 101 | Qb |
| 110 | Ra |
| 111 | Rb |

Figure 12:
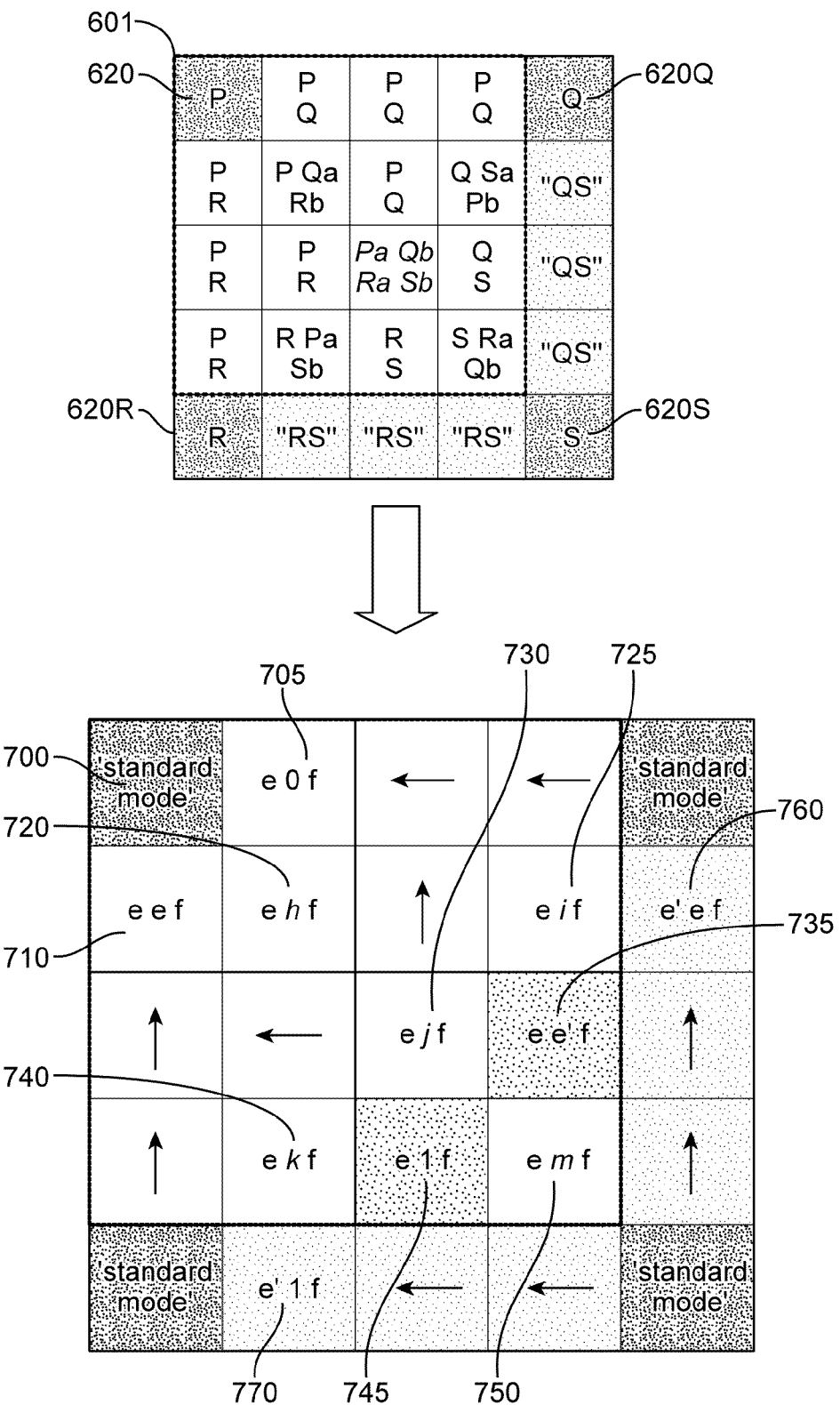
FIG. 12 shows the mapping functions used to map a 2-bit modulation index into the 3-bit palette index in a preferred embodiment of the invention.

FIG. 12 shows a top level view of the mapping functions from the two bits per texel modulation data stored in field, 304, to the 3-bit palette indices of Table 2. The 'e' and T values in the description refer to the two bits, 420, of the per-texel modulation values. FIG. 12 also includes, in addition to the texels shown in 601, the next column of texels to the right and the next row of texels below. Recalling that it is common in 3D computer graphics to perform bilinear filtering of (decompressed) texture data, 2×2 sets of texels will generally need to be decoded in parallel. If one considers the top left texel of such a 2×2 block to be arbitrarily chosen from the 601 region, then the additional three texels, needed for the bilinear texture filtering, may be locked in the addition column and/or row.

The top left texel, 620 and 700, of the offset region, 601, along with the next such texels, 620Q, 620R and 620S, from the neighbouring blocks, are decoded using the same mode as defined in the 'standard' encoding, and so need not be discussed further.

The texel to the immediate right, 705, has its 3-bit index formed from the following bit pattern, "e0f", as do the next two texels on the top row. The leftmost texel on the next row, 710, has its 3-bit index formed from the pattern, "eef", as do the remaining two texels in the leftmost column.

Similarly, the other texels, 725, 730, 735, 740, 745, 750, 760 and 770 are defined in much the same way with the following definitions for the additional symbols:

The symbol, e' is used to indicate the complement of e.
The special symbols, h, i, j, k and m, represent the following expressions:

$$h = e \wedge f \; i = \overline{e} \vee \overline{f}$$

$$k = e \vee f \; m = \overline{e} \wedge \overline{f}$$

$$j = e \oplus f$$

These expressions are inexpensive to implement in hardware.

Note that the choice of which decoding mode is applied to a texel, as described in Table 1, is made on a texel-by-texel basis according to the texel's inclusion in particular aligned and offset blocks and the flags associated with those aligned and offset blocks.

The 2 bpp embodiment will now be described. As with GB2417384, the data is again stored in 64-bit blocks with the same structure as that shown in FIG. 5, except that that each modulation field now refers to a set of 8×4 texels. The representative colours are also spread at a rate of one every eight texels in the x direction, rather than one every four texels as in the 4 bpp embodiment.

In GB2417384, there were two main encoding modes for the modulation data in the 2 bpp embodiment. The simpler mode uses a single bit per texel that simply chooses between the two upscaled base colours. This mode will be referred to as the direct-mapping method. The second mode stores a two bit value for every second texel, in a chess board pattern, and the remaining texels' modulation values are inferred as the average of the values stored at their nearest horizontal neighbours, their two nearest vertical neighbours, or the average of both the horizontal and vertical nearest neighbours. This mode will be referred to as the inferred-mapping method.

As with the 4 bpp embodiment, each small region has a choice of four possible encodings that are governed by the modulation and hard flags. In a first embodiment of the 2 bpp mode, there is no 'palette' mode. Instead, the four modes are simply:

i) The direct-mapping mode with bilinear upscale of the representative colours.

ii) The inferred-mapping with bilinear upscale of the representative colours.

iii) The direct-mapping mode with repetition of the nearest neighbour representative colours.

iv) The inferred-mapping with repetition of the nearest neighbour representative colours.

Figures 13A, 13B:
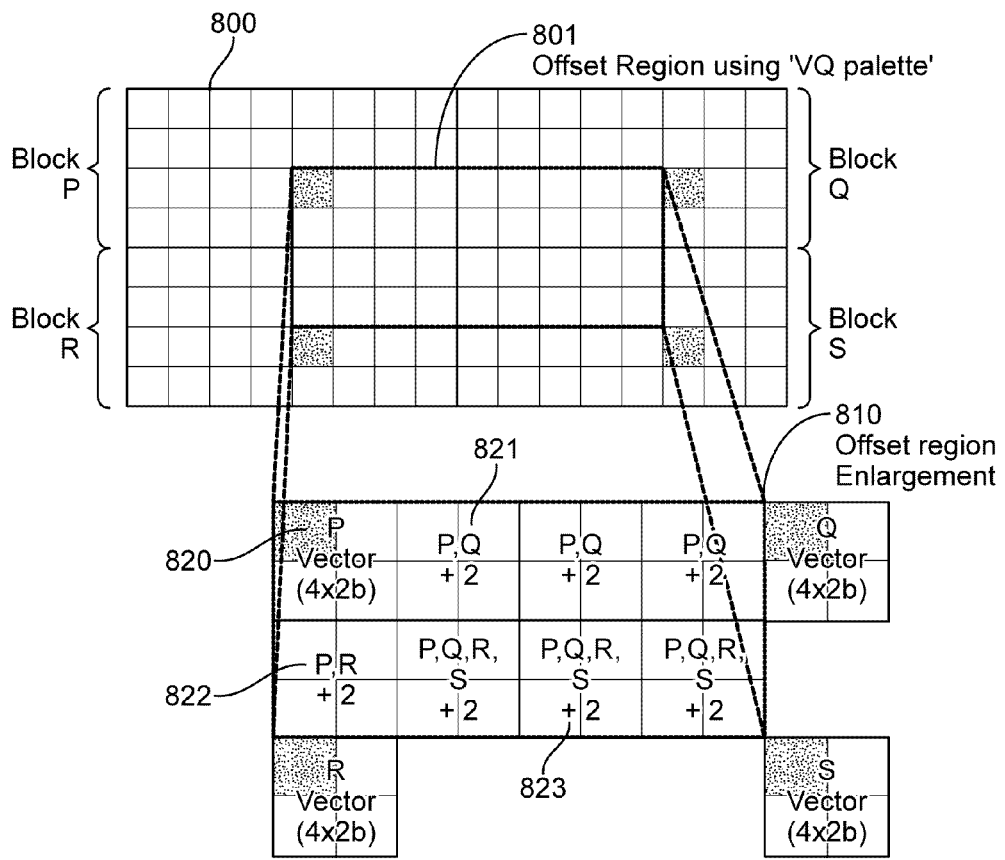
FIG. 13a shows per-texel choices using vector quantization for a 2 bpp embodiment of the invention.
FIG. 13b shows per-texel choices using a local palette for a 2 bpp embodiment of the invention.

In a second, more complex embodiment, as illustrated in FIG. 13a, the fourth encoding option instead uses 2×2 vector quantisation. Within the 2×2 block of aligned texels, 800, the offset region 801 affected by a hard flag, is encoded with the 2×2 vector quantisation mode. The modulation data field 300, uses a total of 8-bits to encoded a 2×2 vector using 2-bits per scalar, which then is representative of the top-left 2×2 block of texels in the offset region, 820. The remaining three 2×2 sets of texels in the top row of the offset region, an example of which is 821, then can choose to be represented by either the encoded vector in block P or the encoded vector in block Q (requiring one bit per vector). An additional two bits per 2×2 set then indicate if the accessed vector should be additionally be reflected horizontally, vertically, or both. This then implies a total of three bits per 2×2 set. Note that the restriction of the initial to be one of that stored in P or Q is again due to the minimal bilinear read requirement.

Similarly, the 2×2 set, 822, on the left of the offset region has a choice of the vectors from P or R, and has the additional option to be flipped vertically, horizontally, or both.

The remaining three 2×2 sets, an example of which is 823, may choose an initial vector from any of the four neighbouring blocks, which again may be flipped. This gives a grand total of 8 (for the stored vector)+3×3 (top row)+1×3 (left vector)+3×4 (bottom row)=32 bits, which exactly fits the total available in the modulation field, 300.

This mode could be extended by noting that certain combinations of stored vectors and flipped modes are redundant. For example, if a stored vector, e.g. that of P, 820, is symmetrical along the Y axis, then selecting this vector and choosing to flip it in the horizontal direction is redundant. The system could detect such an occurrence and substitute an alternative vector. One such option would be to clockwise rotate the vector by 90 degrees. Symmetry in the X axis with a vertical flip could do the same while symmetry in both axes (i.e. if all values in the source vector are identical) and choice of flip modes could be used to modify the source values.

In one embodiment, the fully decoded values are simply used to modulate the interpolated representative colours. In another embodiment, the fully decoded vectors values are used to index into a pre-chosen local palette using an adaptation of the 4 bpp mapping scheme such as that shown in FIG. 13b.

Figure 14:
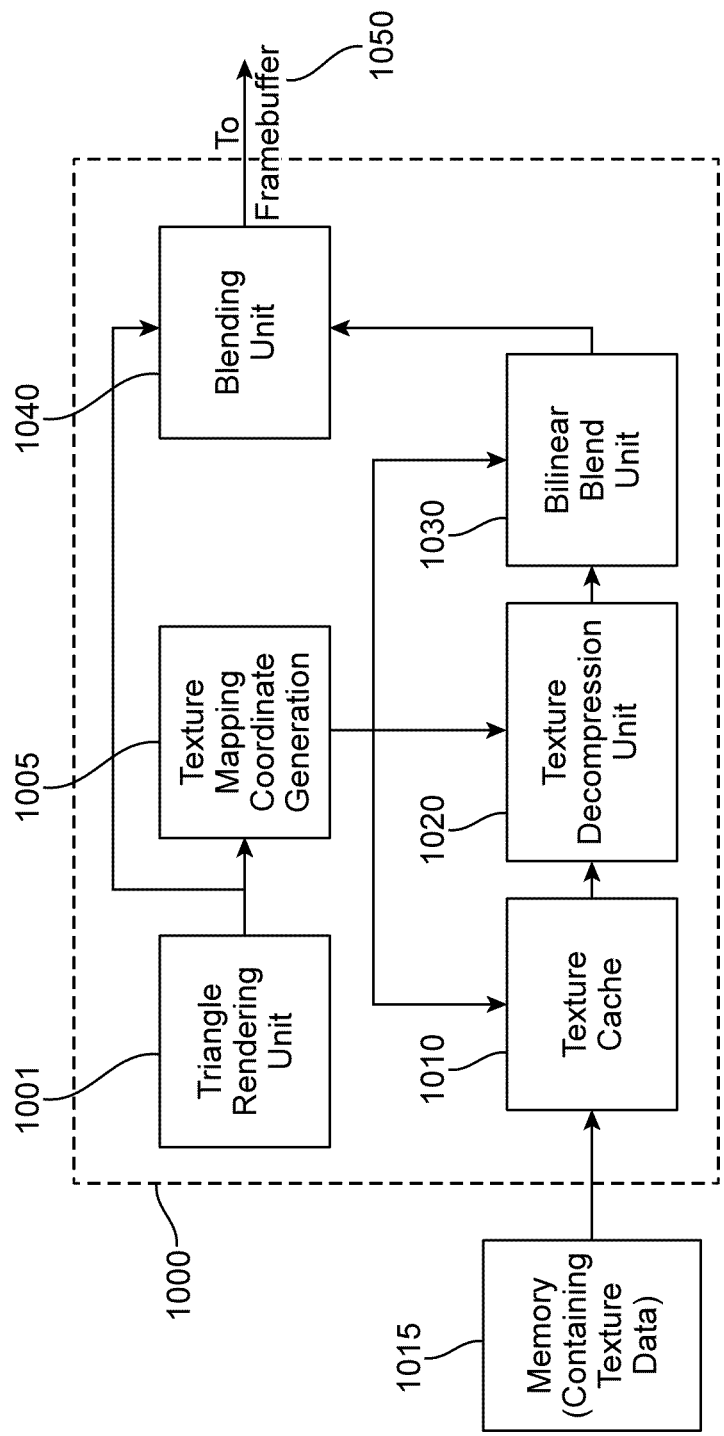
FIG. 14 is a block diagram of a rendering system including a decompression unit in accordance with the present invention.

FIG. 14 is a schematic diagram of a rendering system including a decompressor architecture in accordance with the invention. The rendering system, 1000, contains (amongst other units not shown), a triangle rasterising and visibility determination engine, 1000. This feeds pixels with known associated triangle and texture coordinate data to a texture coordinate generation unit, 1005, which determines texture and texture coordinates for each pixel. The required texture and texture coordinate data, mapped to block data, are preferably supplied to a texture cache unit, 1010, that returns the necessary set of 2×2 data blocks needed to extract 2×2 texels for eventual bilinear filtering. If the texture cache does not contain the required data, it will first fetch it from external memory, 1015.

The returned set of 2×2 data blocks are supplied to the texture decompression unit, 1020, along with the texture coordinates from 1005, in order to determine which subset of 2×2 texels to decode. The decoded 2×2 set of texels are then supplied to a bilinear filtering unit, 1030, which, along with the set of fractional texture address bits from unit 1005, performs bilinear filtering. The resulting colour value then is supplied to a blending unit, 1040, which combines the data. The result is sent to the frame buffer, 1050.

Figure 15:
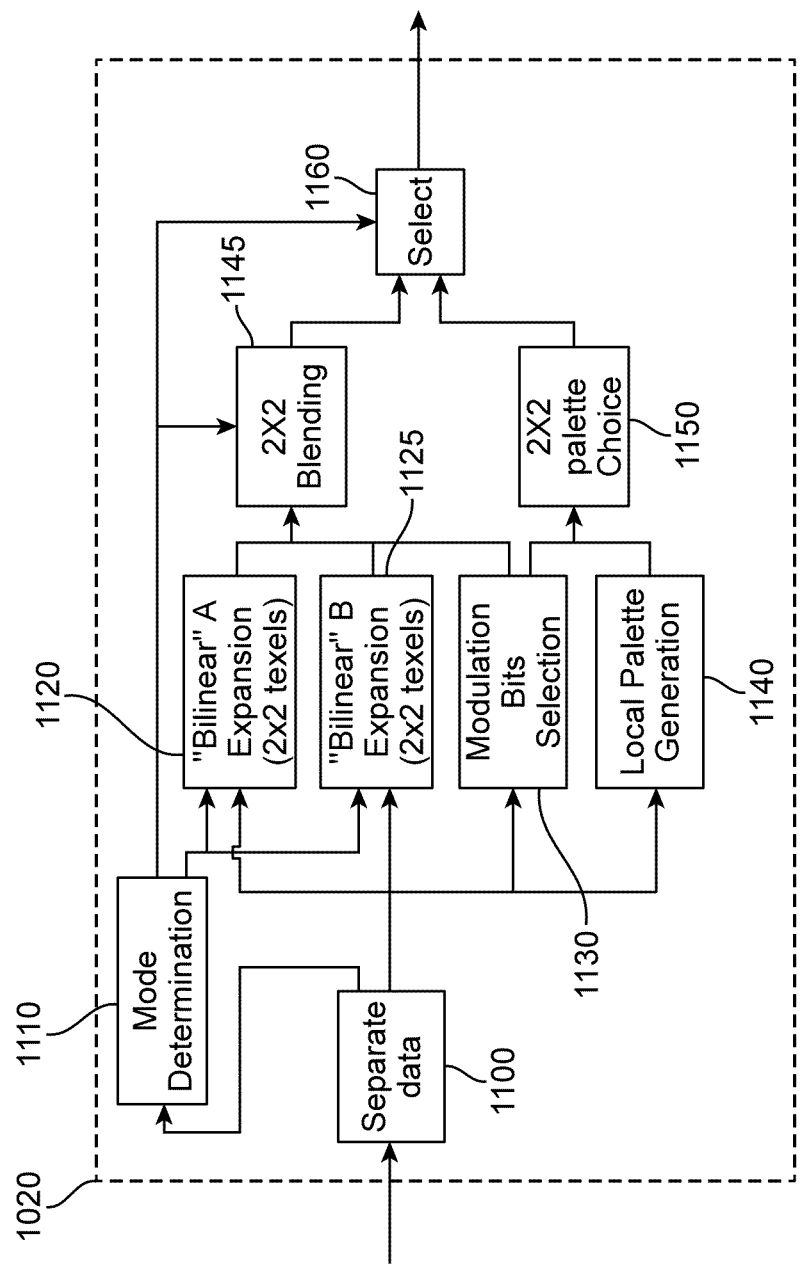
FIG. 15 is a block diagram of the decompression unit of FIG. 14.

Details of the behaviour of the decompression unit, 1020, are shown in FIG. 15. The input blocks from the cache are divided into their component colour, mode, and modulation bits, by separation unit 1100, and the decoding modes for the four target texels are determined from the mode bits, by mode determination unit 1110.

The colour data from the four "A" representative values are bilinearly interpolated in unit 1120 to produce a set of 2×2 texels. For any texels that are using the hard-edged mode, the bilinearly interpolated results are replaced with the associated representative value. Similarly, the four "B" representative values are interpolated by unit 1125.

The modulation bits for the 2×2 set of texels are extracted from the 2×2 source data blocks by unit 1130. For the 2 bpp mode, this may also include interpolation to infer values that are not stored.

The local palette is assembled from the representative colours, by unit 1140.

The interpolated/repeated 'A' colour results from 1120 and the interpolated/repeated 'B' results from 1125 are blended according to the per-texel mode, from 1110, and the per-texel modulation values from 1130, using the blending weights described previously, in 1145.

The sub-palette selection is made by 1150 using the assembled local palette from 1140, and the modulation bits from 1130.

Finally, the per-texel selection between palette colours, from 1150, and blended colours, from 1145, is made in unit 1160 and the four resulting texel values are output.

The invention claimed is:

1. A machine-implemented method of producing image data from compressed source data, comprising:
    accessing compressed source data pertaining to an image;
    interpreting the compressed source data to produce a set of representative colors and modulation data;
    interpreting portions of the modulation data as a plurality of vectors, each pertaining to a respective region of the image and each region of the image respectively having multiple portions, each of which comprises multiple elements of the image, and as vector modifier data;
    determining a respective color for each element within a first portion of the region that is to be constructed, based on the set of representative colors, combined according to a selected vector of the plurality of vectors; and
    determining a respective color for each element within other portions of the region by using the respective vector modifier data associated with that portion to select a vector from the plurality of vectors, to modify that selected vector according to the vector modifier data, and then to combine one or more colors in the set of representative colors, according to the modified selected vector, to produce the colors for the elements in that portion of the region.

2. The method of claim 1, wherein each portion of the region is 2×2 elements, the modified selected vector is 2×2, and the determining a respective color for each element comprises using a corresponding location in the modified selected vector to control a modulation of the representative colors to produce the color for that element.

3. The method of claim 1, wherein each portion of the region is 2×2 elements and the modified selected vector is 2×2 elements, and the determining a respective color for each element comprises using a corresponding location in the modified selected vector as an index into a local color palette to select the color for that element.

4. The method of claim 1, wherein the accessed compressed source data pertains to a plurality of regions of the image, the set of representative colors comprises base colors associated with multiple of the plurality of regions, and the compressed source data comprises a respective flag associated with each region of the image, the method further comprising using the flag to determine how the set of representative colors is produced from the base colors.

5. The method of claim 4, further comprising interpreting the flag to indicate that the set of representative colors should be based only on base colors associated with the region of the image for which colors of elements therein are being determined.

6. The method of claim 5, further comprising forming the set of representative colors to include the base colors associated with the region of the image, for which colors of elements therein are being determined and one or more blends of those base colors.

7. The method of claim 4, further comprising interpreting the flag to indicate that the set of representative colors should be based on base colors associated with multiple regions of the image.

8. The method of claim 7, further comprising producing the set of representative colors by picking base colors associated with regions of the image having a pre-determined relative position with respect to the region of the image for which colors of elements are being determined.

9. The method of claim 1, further comprising interpreting the compressed source data to further comprise a discontinuity flag pertaining to the region of the image, and using a value of the discontinuity flag for controlling whether the set of representative colors has colors from only a single region of the image.

10. The method of claim 1, wherein each region of the image is a rectangular region having 32 elements, and each portion of the image is 2×2 elements.

11. The method of claim 10, wherein the compressed source data comprises 64 bits of data for each region of the image, and includes two base colors associated with that region of the image and 32 bits of modulation data.

12. The method of claim 11, wherein each vector is 2×2 and is allocated 8 bits in the 32 bits of modulation data, with 2 bits for each location in the 2×2 vector, and other bits in the 32 bits of modulation data are allocated to other portions of that region, and the method further comprises interpreting the other bits as a selection of a vector from two vectors each associated with a different region of the image, and as indicating that the selected vector quantization should be flipped vertically, horizontally, or both vertically and horizontally.

13. The method of claim 1, wherein the interpreting of the compressed source data to comprise a respective set of representative colors comprises determining an initial set of two base colors for each of two or more regions of the image.

14. The method of claim 13, further comprising interpreting the compressed source data to further comprise a discontinuity flag pertaining to the region of the image, and using a value of the discontinuity flag for controlling which colors of the initial sets of two base colors are used in determining the respective set of representative colors.

15. A rendering system, comprising:
a source for compressed source data pertaining to a texture image;
a texture decompression circuit configured to
interpret the compressed source data to produce a set of representative colors and modulation data,
interpret portions of the modulation data as a plurality of vectors, each pertaining to a respective region of the image and each region of the image respectively having multiple portions, each of which comprises multiple elements of the image, and as vector modifier data,
determine a respective color for each element within a first portion of the region that is to be constructed, based the set of representative colors, combined according to a selected vector from the plurality of vectors, and
determine a respective color for each element within other portions of the region by using the respective vector modifier data associated with that portion to select a vector from the plurality of vectors, to modify that selected vector according to the vector modifier data, and then to combine one or more colors in the set of representative colors according to the modified selected vector to produce the colors for the elements in that portion of the region; and
a rendering unit configured to receive the produced colors for the elements and use those colors in producing a rendering output.

16. The rendering system of claim 15, wherein each portion of the region is 2×2 and the modified selected vector is 2×2, and the texture decompression circuit is configured for determining a respective color for each element using a corresponding location in the modified selected vector to control a modulation of the representative colors to produce the color for that element.

17. The rendering system of claim 15, wherein each portion of the region is 2×2 and the modified selected vector is 2×2, and the texture decompression circuit is configured for determining a respective color for each element using a corresponding location in the modified selected vector as an index into a local color palette to select the color for that element.

18. The rendering system of claim 15, wherein the accessed compressed source data pertains to a plurality of regions of the image, the set of representative colors comprises base colors associated with multiple of the plurality of regions, and the compressed source data comprises a respective flag associated with each region of the image, and the texture decompression circuit further is configured for using the flag to determine how the set of representative colors is produced from the base colors.

19. The rendering system of claim 18, wherein the texture decompression circuit further is configured to interpret the flag to indicate that the set of representative colors should be based only on base colors associated with the region of the image for which colors of elements therein are being determined.

20. The rendering system of claim 19, wherein the texture decompression circuit further is configured to form the set of representative colors to include the base colors associated with the region of the image, for which colors of elements therein are being determined and one or more blends of those base colors.

21. The rendering system of claim 18, wherein the texture decompression circuit further is configured to interpret the flag to indicate that the set of representative colors should be based on base colors associated with multiple regions of the image.

22. The rendering system of claim 21, wherein the texture decompression circuit further is configured to produce the set of representative colors by picking base colors associated with regions of the image having a pre-determined relative position with respect to the region of the image for which colors of elements are being determined.

23. The rendering system of claim 15, wherein the texture decompression circuit further is configured to interpret the compressed source data to further comprise a discontinuity flag pertaining to the region of the image, and to use a value of the discontinuity flag for controlling whether the set of representative colors has colors from only a single region of the image.

24. The rendering system of claim 15, wherein each region of the image is a rectangular region having 32 elements, and each portion of the image is 2×2 elements, the compressed source data comprises 64 bits of data for each region of the image, and includes two base colors associated with that region of the image and 32 bits of modulation data.

25. The rendering system of claim 24, wherein each vector is 2×2 and is allocated 8 bits in the 32 bits of modulation data as 2 bits for each location in the 2×2 vector, and other bits in the 32 bits of modulation data are allocated to other portions of that region, and the texture decompression circuit further is configured to interpret the other bits as a selection of a vector from two vectors each associated with a different region of the image, and as indicating that the selected vector quantization should be flipped vertically, horizontally, or both vertically and horizontally.

* * * * *